(12) United States Patent  (10) Patent No.: US 9,153,120 B1
Xiao et al.  (45) Date of Patent: Oct. 6, 2015

(54) SYSTEMS AND METHODS FOR LOCATING LOST DEVICES

(71) Applicant: Symantec Corporation, Mountain View, CA (US)

(72) Inventors: Hong Yong Xiao, Sichuan (CN); Eric Zhao, Sichuan (CN)

(73) Assignee: Symantec Corporation, Mountain View, CA (US)

( * ) Notice: Subject to any disclaimer, the term of this patent is extended or adjusted under 35 U.S.C. 154(b) by 7 days.

(21) Appl. No.: 13/927,616

(22) Filed: Jun. 26, 2013

(51) Int. Cl.
*G06F 15/173* (2006.01)
*G08B 21/24* (2006.01)
*G01S 19/16* (2010.01)

(52) U.S. Cl.
CPC ........... *G08B 21/24* (2013.01); *G01S 19/16* (2013.01)

(58) Field of Classification Search
CPC  G01S 19/16; G08B 21/0277; G08B 21/0272; H04L 29/12839; H04W 12/00; H04W 12/12
USPC ........... 340/539.11, 571; 455/456.1; 709/220, 709/224
See application file for complete search history.

(56) References Cited

U.S. PATENT DOCUMENTS

| | | | |
|---|---|---|---|
| 7,668,123 B1* | 2/2010 | Scott et al. | 370/310 |
| 7,848,704 B2* | 12/2010 | Smith | 455/41.2 |
| 7,873,985 B2* | 1/2011 | Baum | 726/2 |
| 8,402,134 B1* | 3/2013 | Hir | 709/224 |
| 2003/0005092 A1* | 1/2003 | Nelson et al. | 709/220 |
| 2010/0100972 A1* | 4/2010 | Lemieux et al. | 726/34 |
| 2011/0067119 A1* | 3/2011 | Baum | 726/34 |
| 2012/0309422 A1* | 12/2012 | Lewis-Evans et al. | 455/456.1 |

OTHER PUBLICATIONS

Jim Casaburi et al.; Systems and Methods for Preventing Mobile Device Loss; U.S. Appl. No. 13/645,348, filed Oct. 4, 2012.
Lookout, Inc.; Lookout Security for the Post-PC Era; https://www.lookout.com; As accessed on Apr. 26, 2013.
Symantec Corporation; Norton Mobile Security; https://mobilesecurity.norton.com/; As accessed on Apr. 26, 2013.

* cited by examiner

*Primary Examiner* — Brent Swarthout
(74) *Attorney, Agent, or Firm* — ALG Intellectual Property, LLC (57) ABSTRACT

A computer-implemented method for locating lost devices may include (1) receiving a report of a lost device that specifies a hardware address that uniquely identifies the lost device, (2) collecting information from a helper device that has been connected to a local area network that indicates that a device with the hardware address of the lost device was observed as being connected to the local area network, (3) receiving location data from the helper device that specifies a location of the helper device, and (4) providing the location of the helper device as a location of the lost device in response to the report. Various other methods and systems are also disclosed.

20 Claims, 7 Drawing Sheets

SYSTEMS AND METHODS FOR LOCATING LOST DEVICES

BACKGROUND

Computing devices have become a ubiquitous part of everyday life. For example, millions of people carry and use mobile computing devices (e.g., cellular telephones, tablets, MP3 players, laptops, etc.) throughout their daily activities. However, such computing devices (especially relatively small, mobile computing devices) may be easily misplaced by users and/or stolen by thieves.

Some traditional techniques for locating a lost device may rely upon installation of a locating application on the device itself. In many instances, this may mean that a locating application must be installed before a device is lost. Furthermore, these traditional techniques may require that a locating application remain installed in order for a lost device to be located.

Unfortunately, it is common practice for mobile device thieves to quickly wipe stolen devices (e.g., by resetting stolen mobile devices to factory defaults), especially before permitting stolen mobile devices to acquire a network connection. By wiping stolen mobile devices, thieves may thereby remove locating applications. Alternatively, some mobile device thieves may uninstall locating applications and/or other security software on mobile devices. By the time the owner realizes that the mobile device is stolen, a thief may have already compromised the mobile device. Accordingly, the instant disclosure identifies and addresses a need for additional and improved systems and methods for locating lost devices.

SUMMARY

As will be described in greater detail below, the instant disclosure generally relates to systems and methods for locating lost devices by having helper devices check the local networks to which they are attached for uniquely identifying hardware characteristics of the lost devices and reporting their findings as well as their current location (e.g., to a central server that records uniquely identifying hardware characteristics of devices before they are lost).

In one example, a computer-implemented method for locating lost devices may include (1) receiving a report of a lost device that specifies a hardware address that uniquely identifies the lost device, (2) collecting information from a helper device that has been connected to a local area network that indicates that a device with the hardware address of the lost device was observed as being connected to the local area network, (3) receiving location data from the helper device that specifies a location of the helper device, and (4) providing the location of the helper device as a location of the lost device in response to the report.

In some examples, the computer-implemented method may also include registering the lost device before the lost device is lost by storing the hardware address of the lost device for later use in locating the lost device.

In some embodiments, the computer-implemented method may also include notifying the helper device that the lost device has been lost by transmitting the hardware address of the lost device to the helper device. Additionally or alternatively, the computer-implemented method may also include requesting hardware addresses from the helper device that identify discoverable devices connected to the local area network for comparison with the hardware address of the lost device. In some examples, the computer-implemented method may also include (1) determining that the lost device is potentially within a specific geographical area, (2) determining that the helper device is within the specific geographical area, and (3) notifying the helper device that the lost device has been lost based on having determined that the helper device is within the specific geographical area.

In one example, the computer-implemented method may also include discovering a match between the information collected from the helper device and the hardware address of the lost device. Additionally or alternatively, the computer-implemented method may include determining that the lost device was observed at the location of the helper device based at least in part on receiving the location data from the helper device.

In one embodiment, a system for implementing the above-described method may include (1) a report module programmed to receive a report of a lost device that specifies a hardware address that uniquely identifies the lost device, (2) a collection module programmed to collect information from a helper device that has been connected to a local area network that indicates that a device with the hardware address of the lost device was observed as being connected to the local area network, (3) a receiving module programmed to receive location data from the helper device that specifies a location of the helper device, (4) a providing module programmed to provide the location of the helper device as a location of the lost device in response to the report, and (5) at least one processor that executes the report module, the collection module, the receiving module, and the providing module.

In one example, another computer-implemented method for locating lost devices may include (1) identifying that a device is connected to a local area network by receiving, at a helper device via a connection to the local area network, a hardware address that uniquely identifies the device, (2) providing the hardware address of the device to facilitate a determination that the hardware address of the device matches a reported hardware address of a known lost device and that, therefore, the device includes the known lost device, (3) identifying location data that specifies a location of the helper device, and (4) providing the location data to facilitate a determination that the known lost device was observed at the location of the helper device.

In some examples, identifying that the device is connected to the local area network may include using a network protocol to discover the lost device on the local area network based on the hardware address of the lost device. Additionally or alternatively, identifying that the device is connected to the local area network may include using a network protocol to obtain hardware addresses identifying discoverable devices connected to the local area network.

In some embodiments, the computer-implemented method may also include (1) receiving, at the helper device, the reported hardware address and (2) determining, at the helper device, that the reported hardware address matches the hardware address of the device. Additionally, the computer-implemented method may include determining, at the helper device, that the known lost device was observed at the location of the helper device, based on (i) the hardware address of the device, (ii) the reported hardware address, and (iii) the location data.

In one example, the computer-implemented method may also include (1) facilitating, from the helper device, the determination that the device includes the known lost device by providing the hardware address of the device to a centralized device that has access to the reported hardware address and (2) providing, from the helper device, the location data to the centralized device. In this example, the centralized device may determine that the known lost device was observed at the location of the helper device based on (i) the hardware address of the device, (ii) the reported hardware address, and (iii) the location data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for locating lost devices. As will be explained in greater detail below, by having helper devices check the local networks to which they are attached for uniquely identifying hardware characteristics of the lost devices and reporting their findings as well as their current location (e.g., to a central server that records uniquely identifying hardware characteristics of devices before they are lost), the systems and methods described herein may locate lost devices even when the lost devices have been wiped of personal information, security applications, and/or device tracking applications. Thus, the systems described herein may even locate a device (e.g., a device that had previously been registered with one or more of the systems described herein) that has been stolen and completely reset to factory defaults and/or wiped.

Figure 1:
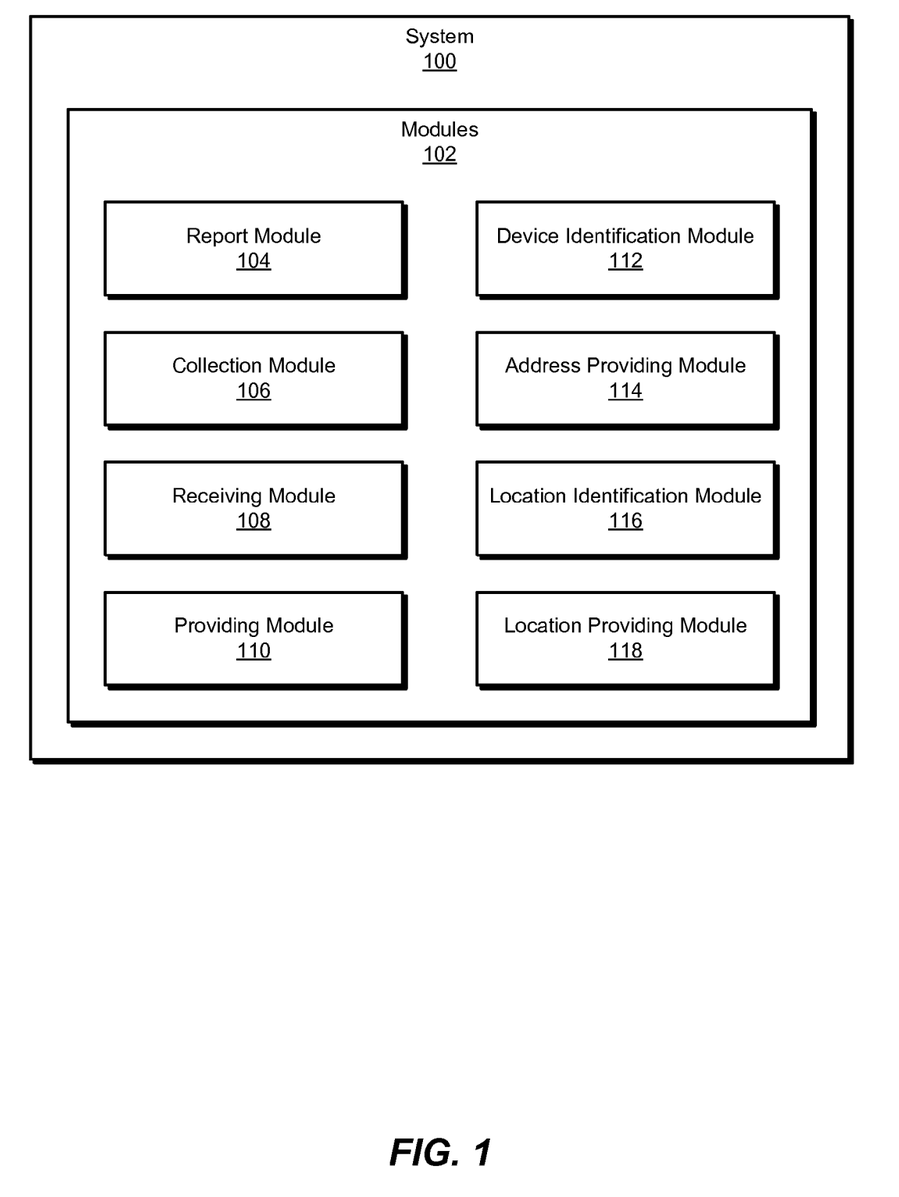
FIG. 1 is a block diagram of an exemplary system for locating lost devices.
Figure 2:
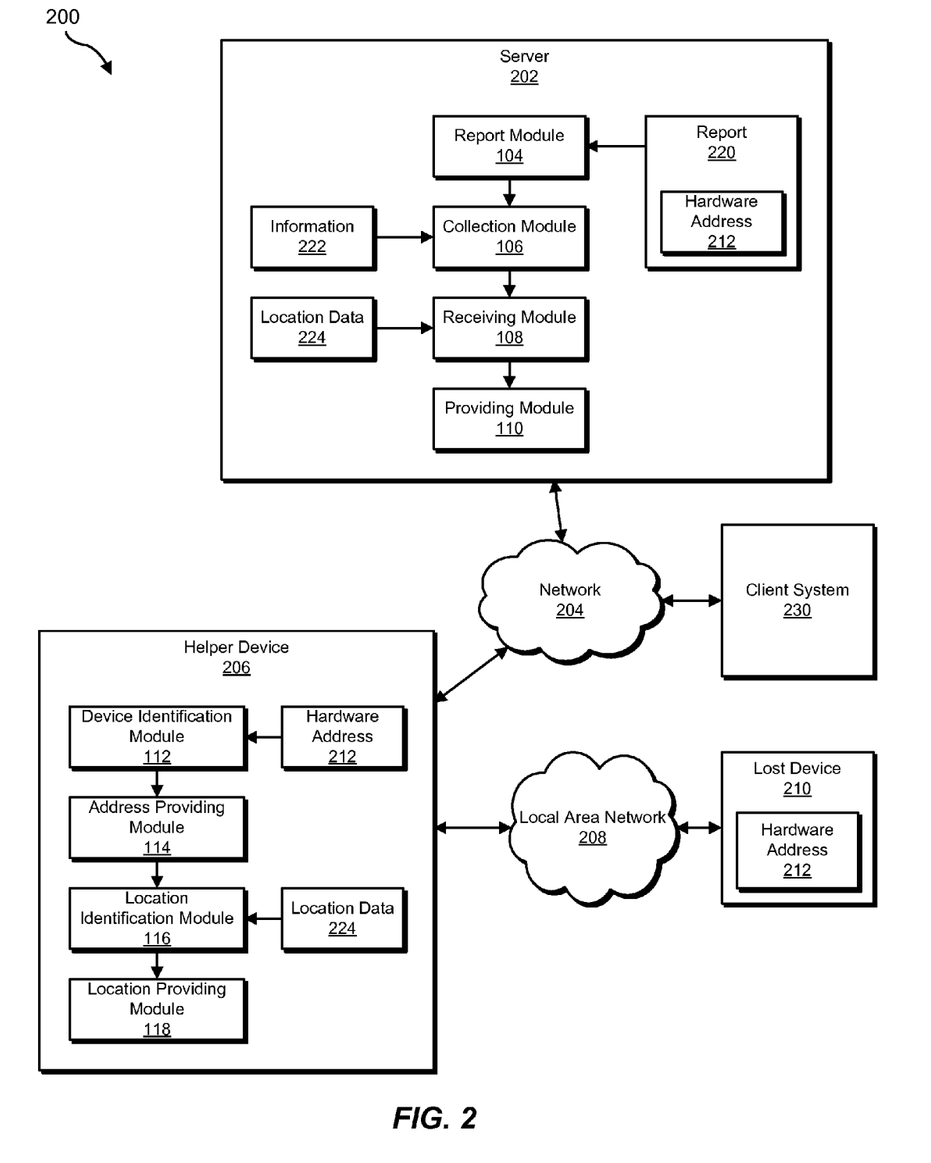
FIG. 2 is a block diagram of an exemplary network environment in which embodiments of the instant disclosure may be implemented.
Figure 3:
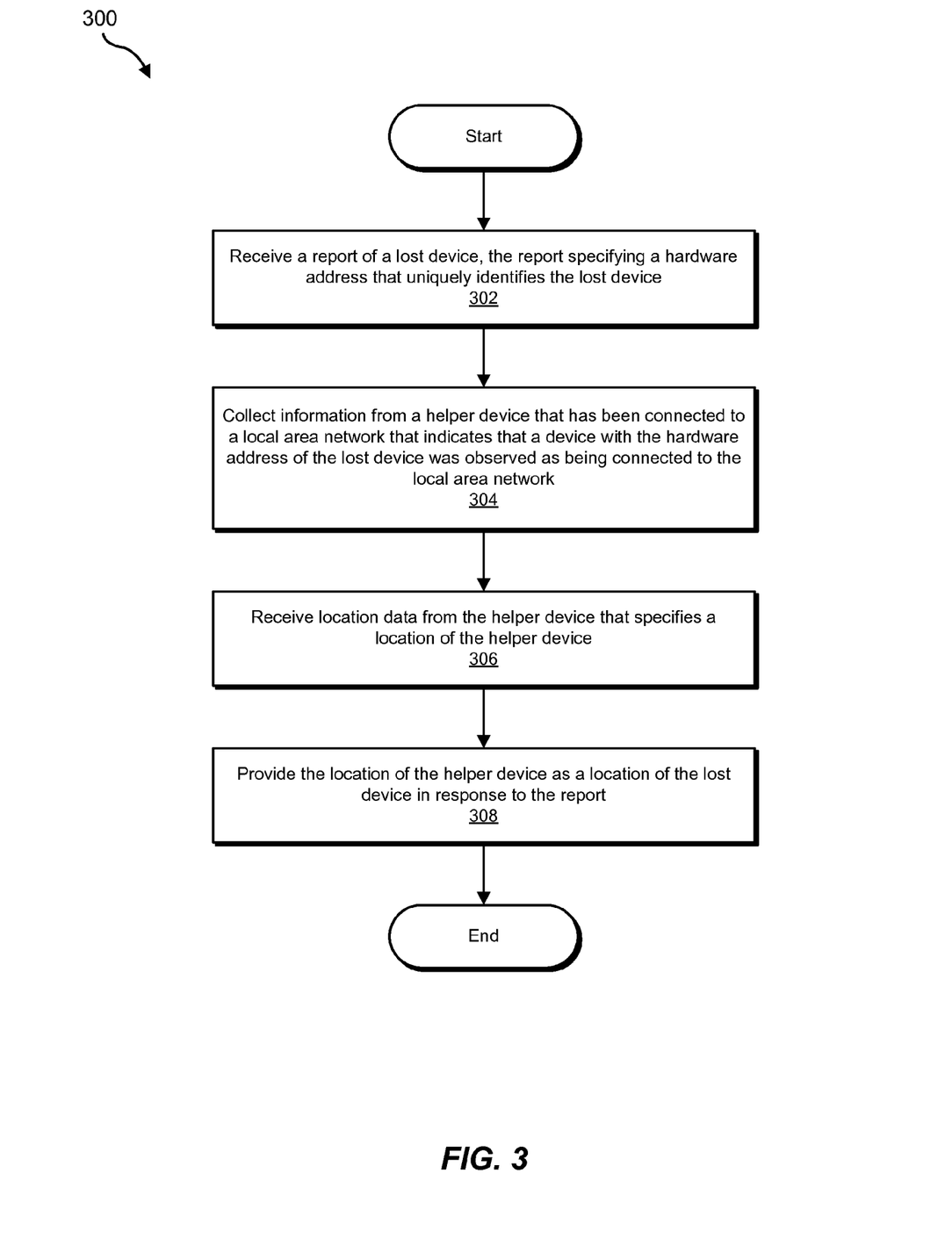
FIG. 3 is a flow diagram of an exemplary method for locating lost devices.
Figure 4:
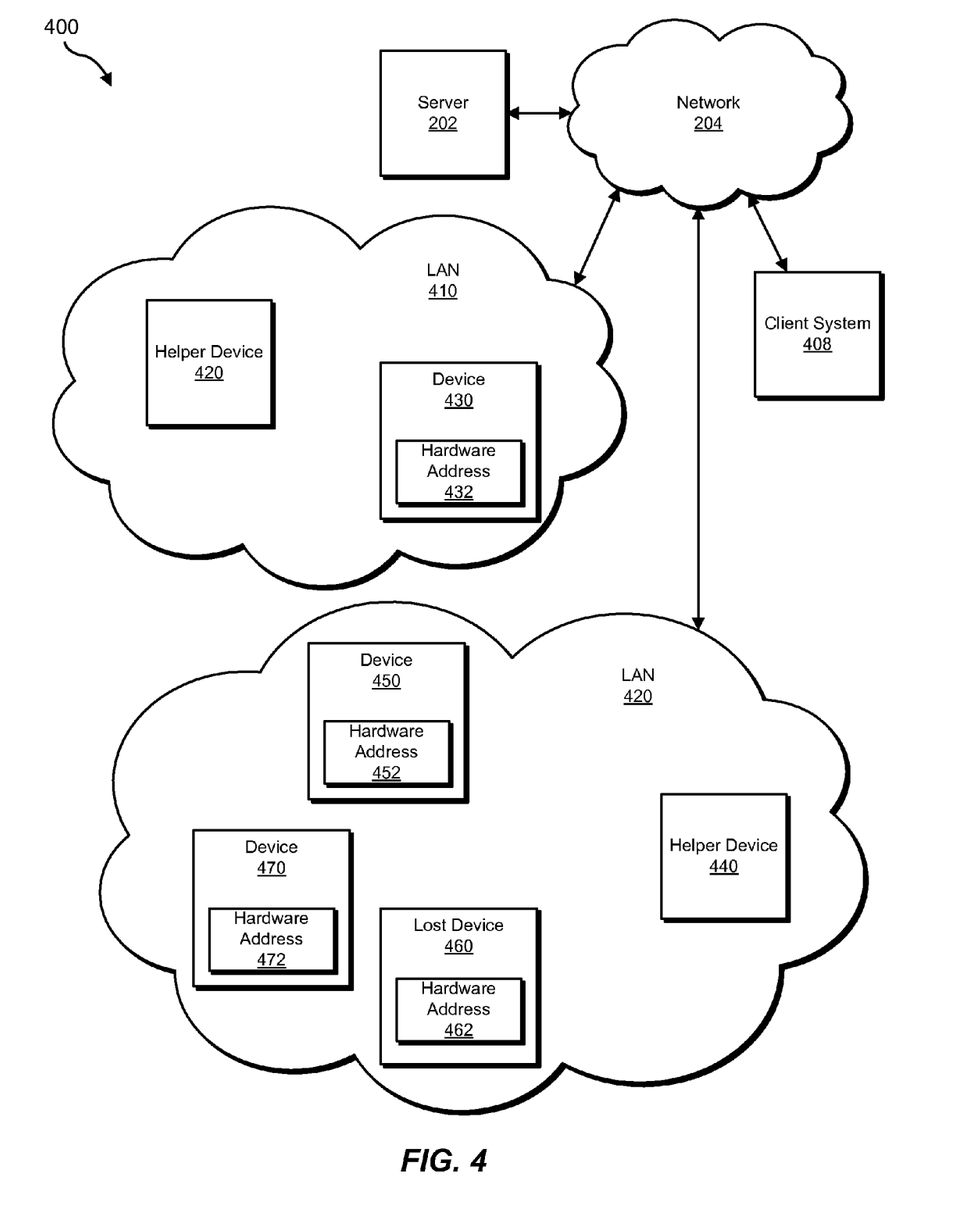
FIG. 4 is a block diagram of another exemplary network environment in which embodiments of the instant disclosure may be implemented.

The following will provide, with reference to FIGS. 1, 2, and 4, detailed descriptions of exemplary systems for locating lost devices. Detailed descriptions of corresponding computer-implemented methods will also be provided in connection with FIGS. 3 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for locating lost devices. As illustrated in this figure, exemplary system 100 may include one or more modules 102 for performing one or more tasks. For example, and as will be explained in greater detail below, exemplary system 100 may include a report module 104 that receives a report of a lost device that specifies a hardware address that uniquely identifies the lost device. Exemplary system 100 may also include a collection module 106 that collects information from a helper device that has been connected to a local area network that indicates that a device with the hardware address of the lost device was observed as being connected to the local area network. Exemplary system 100 may further include a receiving module that receives location data from the helper device that specifies a location of the helper device. Exemplary system 100 may additionally include a providing module 110 programmed to provide the location of the helper device as a location of the lost device in response to the report.

In addition, and as will be described in greater detail below, exemplary system 100 may include a device identification module 112 that identifies that a device is connected to a local area network by receiving, at a helper device via a connection to the local area network, a hardware address that uniquely identifies the device. Exemplary system 100 may also include an address providing module 114 that provides the hardware address of the device to facilitate a determination that the hardware address of the device matches a reported hardware address of a known lost device and that, therefore, the device includes the known lost device. Exemplary system 100 may further include a location identification module 116 that identifies location data that specifies a location of the helper device. Exemplary system 100 may additionally include a location providing module 118 that provides the location data to facilitate a determination that the known lost device was observed at the location of the helper device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., server 202 and/or helper device 206), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a server 202 in communication with a helper device 206 via a network 204. For example, server 202 may represent a server that directs helper device 206 to search for lost devices on local networks. Server 202 may be programmed with one or more of modules 102. Additionally or alternatively, helper device 206 may be programmed with one or more of modules 102.

In one embodiment, one or more of modules 102 from FIG. 1 may, when executed by at least one processor of server 202 and/or helper device 206, facilitate server 202 and/or helper device 206 in locating lost devices. For example, and as will be described in greater detail below, one or more of modules 102 may cause server 202 and/or helper device 206 to (1) receive a report 220 of a lost device 210 (e.g., from a client system 230) that specifies a hardware address 212 that uniquely identifies lost device 210, (2) collect information 222 from helper device 206 that has been connected to a local area network 208 that indicates that a device with hardware address 212 of lost device 210 was observed as being connected to local area network 208, (3) receive location data 224 from helper device 206 that specifies a location of helper device 206, and (4) provide the location of helper device 206 as a location of lost device 210 (e.g., to client system 230) in response to report 220.

Additionally, as will be described in greater detail below, one or more of modules 102 may cause server 202 and/or helper device 206 to (1) identify that a device (e.g., lost device 210) is connected to local area network 208 by receiving, at helper device 206 via a connection to local area network 208, hardware address 212 that uniquely identifies the device (e.g., lost device 210), (2) provide hardware address 212 of the device (e.g., lost device 210) to facilitate a determination that hardware address 212 matches a reported hardware address of a known lost device and that, therefore, the device includes the known lost device (e.g., lost device 210), (3) identify location data 224 that specifies a location of helper device 206, and (4) provide location data 224 to facilitate a determination that the known lost device (e.g., lost device 210) was observed at the location of helper device 206.

Server 202 generally represents any type or form of computing device capable of reading computer-executable instructions. Examples of server 202 include, without limitation, application servers and database servers configured to provide various database services and/or run certain software applications.

Helper device 206 generally represents any type or form of computing device that is capable of reading computer-executable instructions. Examples of helper device 206 include, without limitation, without limitation, cellular phones, laptops, tablets, wireless access points, network routers, desktops, servers, Personal Digital Assistants (PDAs), multimedia players, embedded systems, combinations of one or more of the same, exemplary computing system 610 in FIG. 6, or any other suitable computing device.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 may facilitate communication or data transfer using wireless or wired connections. In one embodiment, network 204 may facilitate communication between server 202 and helper device 206.

Local area network 204 generally represents any medium or architecture capable of facilitating communication or data transfer. Examples of network 204 include, without limitation, an intranet, a Local Area Network (LAN), a Personal Area Network (PAN), a Near Field Communications network, a Campus Area Network (CAN), exemplary network architecture 700 in FIG. 7, or the like. Network 204 may facilitate communication or data transfer using wireless or wired connections. In one embodiment, network 204 may facilitate communication between server 202 and helper device 206.

FIG. 3 is a flow diagram of an exemplary computer-implemented method 300 for locating lost devices. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7. In some examples, method 300 may include steps performed by a server that coordinates searches for lost devices.

As illustrated in FIG. 3, at step 302 one or more of the systems described herein may receive a report of a lost device that specifies a hardware address that uniquely identifies the lost device. For example, at step 302 report module 104 may, as part of server 202 in FIG. 2, receive report 220 of lost device 210 (e.g., from client system 230) that specifies hardware address 212 that uniquely identifies lost device 210.

As used herein, the phrase "lost device" may refer to any lost, misplaced, stolen, and/or otherwise sought computing device with network connectivity capabilities. In some examples, the lost device may include a mobile device.

As used herein, the phrase "hardware address" may refer to any identifier and/or value capable of distinguishing a computing device. In some examples, the phrase "hardware address" may refer to an identifier corresponding to a component within a computing device (e.g., a component that is integrated into the computing device and that is not designed for consumer replacement within the computing device), such as a network interface device. Additionally or alternatively, the phrase "hardware address" may refer to an identifier of a computing device that is not removed from the computing device by wiping a primary storage device of the computing device, by resetting the computing device to factory settings. For example, the phrase "hardware address" may refer to an identifier of a computing device that is stored within read-only memory within the device and/or within firmware within the device. Examples of hardware addresses may include, without limitation, media access control ("MAC") addresses and Extended Unique Identifiers ("EUIs").

Report module 104 may receive the report in any suitable context. For example, report module 104 may execute on a server that coordinates searches for lost devices. Accordingly, report module 104 may receive a report from a client system that a user of the client system has lost a device (e.g., a mobile device was stolen from the user). The report may specify the hardware address in any of a variety of ways. For example, the report may include the hardware address. Additionally or alternatively, the report may include information that is associated with the hardware address (e.g., such that the hardware address may be looked up with the information).

In one example, report module 104 may have registered the lost device before the lost device was lost by storing the hardware address of the lost device for later use in locating the lost device. For example, an owner of the lost device may have established an account with a device location service (e.g., via report module 104) and submitted the hardware address to the device location service to protect against the possibility that the lost device would become lost. In one example, the owner may have installed an application on the device (before it was lost) that harvested the hardware address from the device and send the hardware address to report module 104 to register the device. Accordingly, the owner may report the lost device missing by sending information to report module 104 identifying and authenticating the owner through the account previously established by the owner and/or by the lost device.

In some examples, report module 104 may also notify a helper device (or many helper devices) that the lost device has been lost by transmitting the hardware address of the lost device to the helper device. As used herein, the phrase "helper device" may refer to any computing device that is capable of connecting to a network. In some examples, the phrase "helper device" may refer to a mobile computing device. In these examples, helper devices may help to locate lost devices by connecting to various local networks and searching for the lost devices. In another example, the phrase "helper device" may refer to a wireless access point. In this example, helper devices may help to locate lost devices by potentially providing network connections to lost devices. Further examples of helper devices may include desktop computing devices, which may help to locate lost devices by monitoring local networks to which they are connected to observe lost devices that connect to the local networks. Once report module 104 notifies the helper device that the lost device has been lost by transmitting the hardware address of the lost device to the helper device, the helper device may monitor local networks for any device with the hardware address.

In some examples, report module 104 may only notify a subset of candidate helper devices that the lost device has been lost. For example, report module 104 may determine that the lost device is potentially within a specific geographical area (e.g., a specific country, within 100 mile radius of a specific location, etc.). In some examples, report module 104 may determine that the lost device is potentially and/or likely within the specific geographic area based on information received in the report (e.g., information indicating where the owner last saw the lost device, when the owner last saw the device, etc.). Report module 104 may then determine that the helper device is within the specific geographical area (e.g., by receiving location data from the helper device). Report module 104 may subsequently notify the helper device that the lost device has been lost based on having determined that the helper device is within the specific geographical area. By only notifying those helper devices that are plausible candidates for observing the lost device, report module 104 may ensure that search resources for lost devices are used efficiently.

Instead of transmitting the hardware address to one or more helper devices, in some examples, report module 104 may request, from helper devices, hardware addresses that identify discoverable devices connected to the local area network for comparison with the hardware address of the lost device. In these examples, the helper device may simply gather and transmit hardware addresses rather than seeking out the hardware address specifically.

An example of report module 104 performing step 302 may be provided in FIG. 4, which illustrates an exemplary computing system 400. As shown in FIG. 4, computing system 400 may include server 202 connected to a client system 408, a LAN 410, and a LAN 420 via network 204. LAN 410 may include a helper device 420 and a device 430 with a hardware address 432. LAN 420 may include a helper device 440 as well as a device 450 with a hardware address 452, a lost device 460 with a hardware address 462, and a device 470 with a hardware address 472. Using FIG. 4 as an example, at step 302 report module 104 may, as a part of server 202, receive a report from client system 408 that lost device 460 is lost. In this example, the report may include an indication of a hardware address 462 of lost device 460 (e.g., that was previously uploaded to server 202 by lost device 460 before lost device 460 became lost). In some examples, server 202 may then notify helper devices 420 and 440 that lost device 460 is lost by transmitting hardware address 462 to helper devices 420 and 440. Alternatively, report module 104 may request that helper devices 420 and 440 send all observed hardware addresses to server 202. Additionally or alternatively, in some examples report module 104 may determine that only helper device 440 is within a geographical area where lost device 460 may be found, and may therefore only notify helper device 420 and not helper device 420 that lost device 460 has been lost.

As mentioned earlier, method 300 in FIG. 3 may include steps performed by a centralized server that coordinates searches for lost devices. In some examples, method 500 illustrated in FIG. 5 may include steps performed by devices in the field that search for lost devices and report their findings to a centralized server. The steps shown in FIG. 5 may be performed by any suitable computer-executable code and/or computing system. In some embodiments, the steps shown in FIG. 5 may be performed by one or more of the components of system 100 in FIG. 1, system 200 in FIG. 2, computing system 610 in FIG. 6, and/or portions of exemplary network architecture 700 in FIG. 7.

Figure 5:
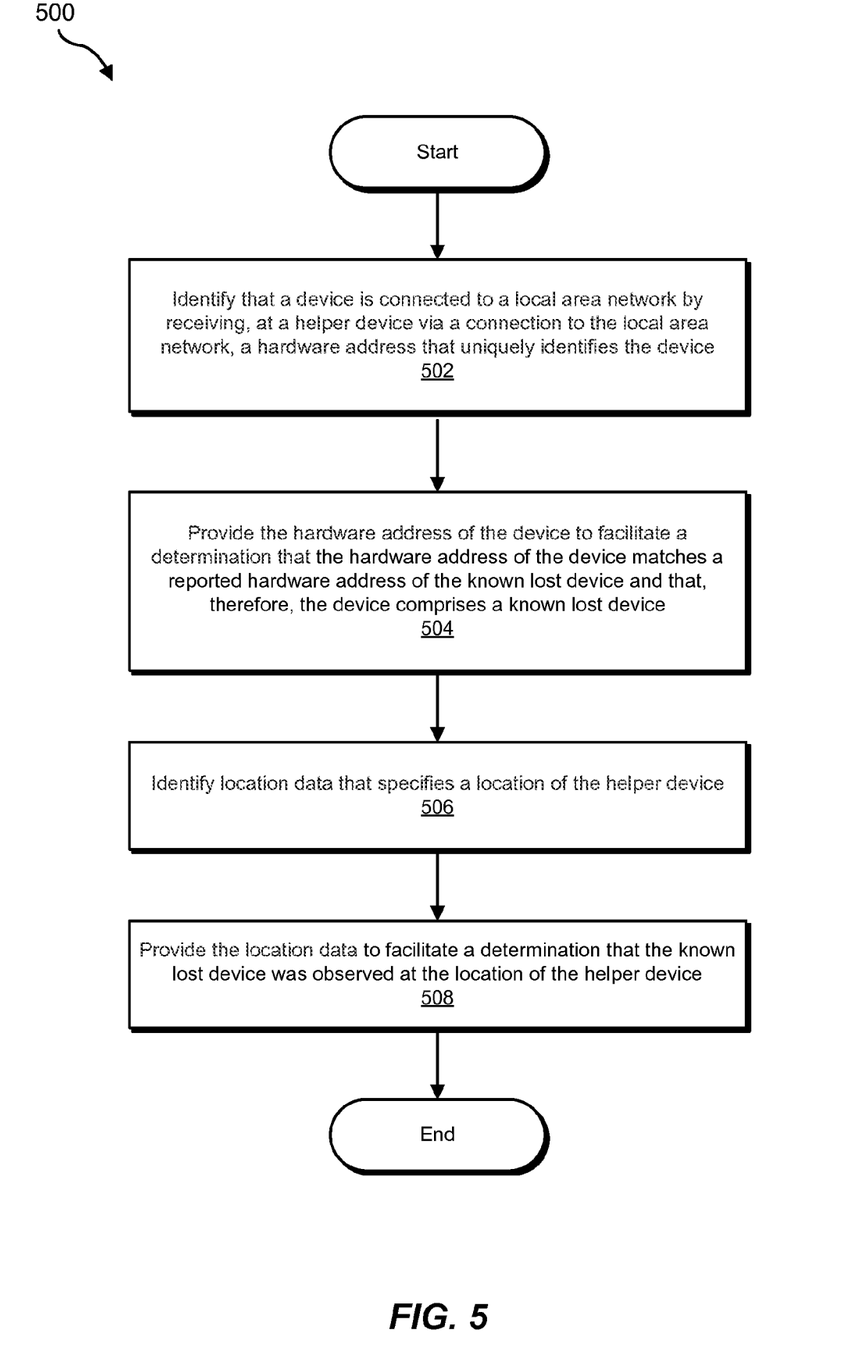
FIG. 5 is a flow diagram of another exemplary method for locating lost devices.

As illustrated in FIG. 5, at step 502 one or more of the systems described herein may identify that a device is connected to a local area network by receiving, at a helper device via a connection to the local area network, a hardware address that uniquely identifies the device. For example, at step 502 device identification module 112 may, as part of helper device 206 in FIG. 2, identify that a device (e.g., lost device 210) is connected to local area network 208 by receiving, at helper device 206 via a connection to local area network 208, hardware address 212 that uniquely identifies the device (e.g., lost device 210).

Device identification module 112 may receive the hardware address in any of a variety of ways. In some embodiments, device identification module 112 may use a network protocol to discover the lost device on the local area network based on the hardware address of the lost device. For example, device identification module 112 may use a network protocol that, given a MAC address, returns a local IP address of any device with the MAC address that is connected to the local area network. In this example, device identification module 112 may use the Reverse Address Resolution Protocol to receive the hardware address (i.e., device identification module 112 may receive the hardware address via the connection to the local area network by receiving confirmation via the connection to the local area network that the hardware address represents a device currently connected to the local area network).

In another example, device identification module 112 may use a network protocol to obtain hardware addresses identifying discoverable devices connected to the local area network. For example, device identification module 112 may use a network protocol that produces mappings of MAC addresses to local IP addresses of devices connected to the local area network. In this example, device identification module 112 may use the Address Resolution Protocol. In one example, device identification module 112 may use a BLUETOOTH networking protocol to obtain the hardware address.

In some examples, device identification module 112 may only check the local area network for the hardware address under certain scenarios to conserve computing resources. For example, device identification module 112 may operate on a mobile computing device with limited battery capacity. In this example, device identification module 112 may passively check for the hardware address on the local area network by only checking when the mobile computing device is already in use and/or when another background application on the mobile computing device is already using the network.

Using FIG. 4 as an example of device identification module 112 performing step 502, at step 502 device identification module 112 may, as a part of helper device 440, identify lost device 460 as connected to LAN 420 by receiving hardware address 462 via a connection to LAN 420.

Returning to FIG. 5, at step 504 one or more of the systems described herein may provide the hardware address of the device to facilitate a determination that the hardware address of the device matches a reported hardware address of a known lost device and that, therefore, the device comprises the known lost device. For example, at step 504 address providing module 114 may, as part of helper device 206 in FIG. 2, provide hardware address 212 of the device (e.g., lost device 210) to facilitate a determination that hardware address 212 matches a reported hardware address of a known lost device and that, therefore, the device includes the known lost device (e.g., lost device 210).

Address providing module 114 may provide the hardware address to any suitable receiving entity. For example, address providing module 114 may provide the hardware address to a lost device location server (e.g., computing device 202 in FIG. 2) to facilitate the lost device location server determining that the hardware address of the device matches a reported hardware address of a known lost device. Additionally or alternatively, address providing module 114 may provide the hardware address to another module on the same computing device (e.g., on helper device 206 in FIG. 2). In this example, address providing module 114 may cause helper device 206 to determine that the hardware address of the device matches a reported hardware address of a known lost device.

In one example, one or more of the systems described herein may receive, at the helper device, the reported hardware address (because, e.g., as explained earlier, one or more of the systems described herein may have notified helper device 206 of the known lost device with the reported hardware address). In this example, these systems may subsequently determine, at the helper device, that the reported hardware address matches the hardware address of the device.

Using FIG. 4 as an example of address providing module 114 performing step 504, at step 504 address providing module 114 may, as a part of helper device 440, provide hardware address 462 to one or more systems to facilitate a determination that hardware address 462 matches a reported hardware address of a known lost device. For example, helper device 440 may have received the reported hardware address (e.g., from server 202). In this example, address providing module 114 may provide hardware address 462 for the determination to be performed on helper device 440. Additionally or alternatively, address providing module 114 may provide hardware address 462 to server 202 (which may store the reported hardware address) for the determination to be performed on server 202.

As discussed above, a helper device may provide information pertaining to a lost device to a centralized server. As will be discussed below, the centralized server may collect this information from the helper device. Returning to FIG. 3, at step 304 one or more of the systems described herein may collect information from a helper device that has been connected to a local area network that indicates that a device with the hardware address of the lost device was observed as being connected to the local area network. For example, at step 304 collection module 106 may, as part of server 202 in FIG. 2, collect information 222 from helper device 206 that has been connected to a local area network 208. Information 222 may indicate that a device with hardware address 212 of lost device 210 was observed as being connected to local area network 208.

Collection module 106 may collect any of a variety of information from the helper device that may indicate that the device with the hardware address of the lost device was observed as being connected to the local area network. For example, collection module 106 may collect the hardware address from the helper device. Additionally or alternatively, collection module 106 may collect a "lost device found" message from the helper device indicating that the helper device observed the lost device connected to the local area network. In some examples, collection module 106 may collect a location of the lost device from the helper device (e.g., based on the helper device having been connected to the same local area network as the lost device).

As mentioned above, in one example, collection module 106 may collect the hardware address of the lost device from the helper device. In this example, collection module 106 may discover a match between the information collected from the helper device and the hardware address of the lost device.

Using FIG. 4 as an example of collection module 106 performing step 304, at step 304 collection module 106 may, as a part of server 202, collect information from helper device 440 indicating that helper device 440 and lost device 460 were both connected to LAN 420 at the same time.

Returning to the helper device, in addition to (or as a part of) providing information about having observed the lost device, the helper device may identify and provide data describing its own location to facilitate locating the lost device. As illustrated in FIG. 5, at step 506 one or more of the systems described herein may identify location data that specifies a location of the helper device. For example, at step 506 location identification module 116 may, as part of helper device 206 in FIG. 2, identify location data 224 that specifies a location of helper device 206.

Location identification module 116 may identify the location data using any of a variety of techniques. For example, location identification module 116 may query a positioning device (such as a global positioning system device) within the helper device for the position of the mobile computing system. In another example, location identification module 116 may perform a look-up of the location of the local area network. Additionally or alternatively, location identification module 116 may retrieve the location from and/or calculate the location using a Wi-Fi triangulation technique, a mobile positioning technique (such as cellular signal triangulation and/or multilateration), and/or any other suitable method for locating and/or approximating the location of the helper device.

Using FIG. 4 as an example of location identification module 116 performing step 506, at step 506 location identification module 116 may, as a part of helper device 440, identify location data that specifies the location of helper device 440.

Returning to FIG. 5, at step 508 one or more of the systems described herein may provide the location data to facilitate a determination that the known lost device was observed at the location of the helper device. For example, at step 508 location providing module 118 may, as part of helper device 206 in FIG. 2, provide location data 224 to facilitate a determination that the known lost device (e.g., lost device 210) was observed at the location of helper device 206.

Location providing module 118 may provide the location data to any suitable receiving entity. For example, location providing module 118 may provide the location data to a lost device location server (e.g., server 202 in FIG. 2) to facilitate the lost device location server determining that the known lost device was observed at the location of the helper device. Additionally or alternatively, location providing module 118 may provide the location to another module on the same computing device (e.g., on helper device 206 in FIG. 2). In this example, location providing module 118 may cause helper device 206 to determine that the known lost device was observed at the location of helper device 206, based on the hardware address of the device, the reported hardware address of the known lost device, and the location data of helper device 206.

As another example, one or more of the systems described herein may (1) facilitate, from the helper device, the determination that the device includes the known lost device by providing the hardware address of the device to a centralized device that has access to the reported hardware address and (2) provide, from the helper device, the location data to the centralized device. In this example, the centralized device may determine that the known lost device was observed at the location of the helper device based on (i) the hardware address of the device, (ii) the reported hardware address, and (iii) the location data.

Accordingly, while the helper device may observe the hardware address of the lost device via the connection to the local area network, either the helper device or a centralized device may combine the observation with the report of the lost device (e.g., including the hardware address of the lost device) to determine that the lost device was observed at the location of the helper device.

Returning to FIG. 3, at step 306 one or more of the systems described herein may receive location data from the helper device that specifies a location of the helper device. For example, at step 306 receiving module 108 may, as part of server 202 in FIG. 2, receive location data 224 from helper device 206 that specifies a location of helper device 206.

Receiving module 108 may receive the location data in any suitable format. For example, receiving module 108 may receive coordinates of the helper device. Additionally or alternatively, receiving module 108 may receive information useful to identify the location of the helper device (e.g., names of surrounding wireless networks).

In some examples, receiving module 108 may determine that the lost device was observed at the location of the helper device based at least in part on receiving the location data from the helper device. In these examples, the location data itself may constitute a message that the lost device was observed at the indicated location. In at least one example, receiving module 108 may also receive information indicating when the helper device observed the lost device connected to the local area network.

Using FIG. 4 as an example, at step 306 receiving module 108 may, as a part of server 202, receive location data from helper device 440 that specifies the location of helper device 440 (and, therefore, the location of lost device 460).

Returning to FIG. 3, at step 308 one or more of the systems described herein may provide the location of the helper device as a location of the lost device in response to the report. For example, at step 308 providing module 110 may, as part of server 202 in FIG. 2, provide the location of helper device 206 as a location of lost device 210 (e.g., to client system 230) in response to report 220.

Providing module 110 may provide the location in any suitable manner. For example, providing module 110 may provide the location by using contact information provided by an owner of the lost device when the owner registered the lost device (e.g., before the lost device was lost) and/or when the owner reported the lost device as lost. For example, providing module 110 may send an email to the owner reporting the last seen location (or locations) of the lost device. As another example, providing module 110 may provide the location in web-accessible reports (e.g., that the owner can see upon signing in to an account). After step 308, method 300 may terminate.

In one example, when an owner loses a device, another person who has found and/or stolen the device may use the device in a public hotspot. This may expose the MAC address of the device in the subnet of the hotspot. An additional device may have a locating application installed. This locating application may see the MAC address of the device when the additional device is connected to the same hotspot as the lost device.

A locating application server may provide a web page for a user to log in and to view the location of any registered devices. The locating application server may also receive location reports from the locating application installed on the additional device (and any similarly configured devices).

The locating application installed on the additional device may be installed on any of a variety of devices, including ANDROID devices, APPLE IOS devices, and laptops. The locating application may report its location and the location of the lost device.

The preceding systems may work to locate lost devices in any of a variety of ways. A use case of these systems may include (1) installation: when a user first installs the locating application on the user's device, the locating application may bind the device's MAC address with the user's account on the locating application server, (2) report loss: when the user attempts to locate the device via a web application, the locating application server may mark the device as lost, (3) dispatch task: the locating application server may dispatch the MAC address of any lost devices to some or all devices with the locating application installed, (4) report location: the devices with the locating application installed may monitor the MAC address in their connected subnets and report the current location of the Wi-Fi area to the locating application server if the MAC address appears, and (5) track device: the user may track the location of the lost device via the web application.

Figure 6:
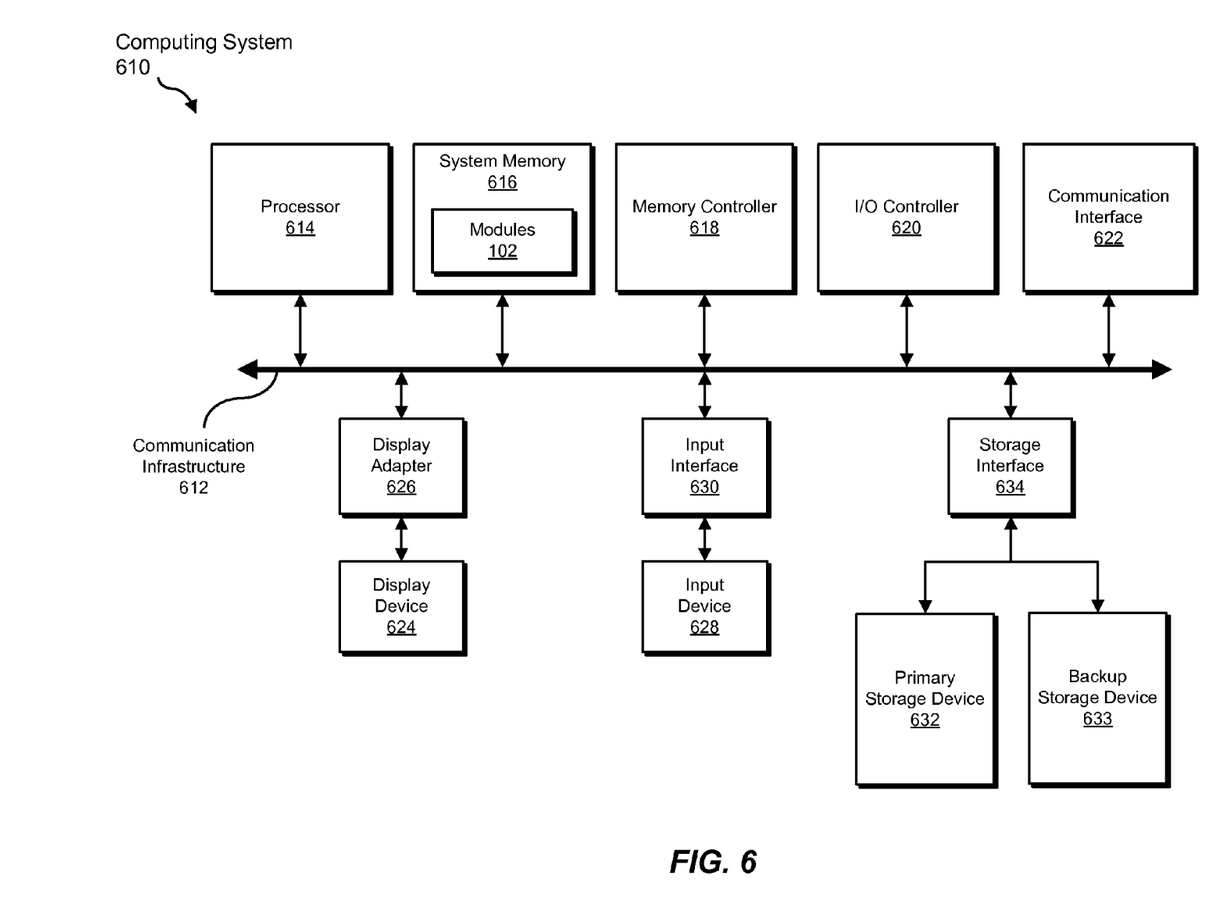
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
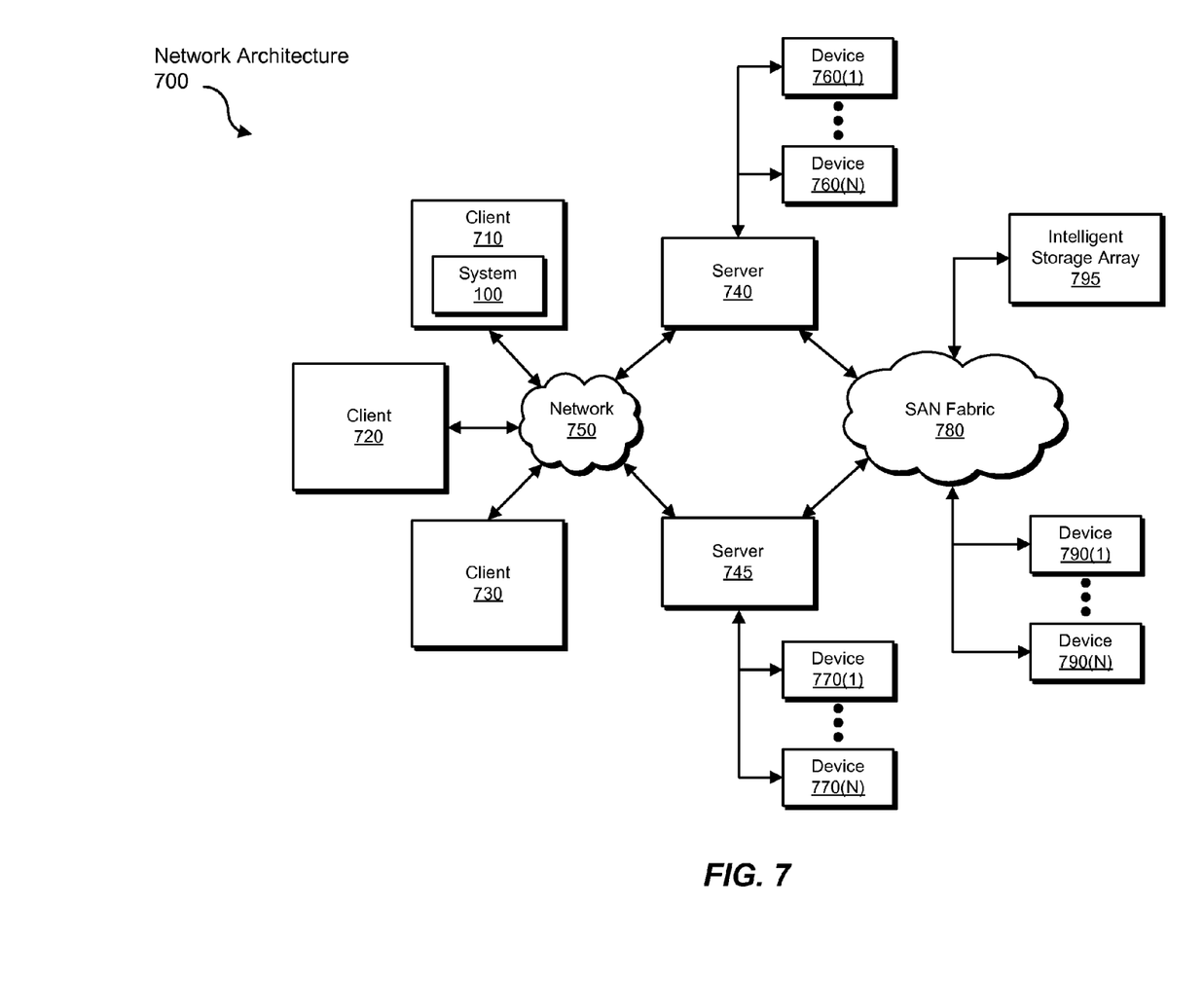
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for locating lost devices.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive a hardware address of a lost device to be transformed, transform the hardware address into a location of the lost device, output a result of the transformation to a web application, use the result of the transformation to inform an owner of the lost device of the location of the lost device, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for locating lost devices, at least a portion of the method being performed by a computing device comprising at least one processor, the method comprising:
   receiving, at a server, a hardware address of a mobile device that uniquely identifies the mobile device in response to an installation of a locating application on the mobile device, the locating application thereby aiding the server in finding the mobile device in case of loss and enabling the mobile device to aid the server in finding other mobile devices in case of loss;
   receiving, at the server, a report that the mobile device has become a lost device;
   collecting, at the server, information from an instance of the locating application that is installed on a helper mobile device that has been connected within a local area network that indicates to the server that an observed device with the hardware address of the lost device was observed as being connected within the local area network, wherein the server does not transmit the hardware address to the helper mobile device and the helper mobile device gathers and transmits a plurality of observed hardware addresses within the local area network to the server;
   searching, at the server, the plurality of observed hardware addresses for the hardware address to determine that the hardware address of the lost device was observed as being connected within the local area network;
   receiving, at the server, location data from the helper mobile device that specifies a location of the helper mobile device;
   providing, from the server, the location of the helper mobile device as a location of the lost device in response to the report.

2. The computer-implemented method of claim 1, further comprising registering the lost device before the lost device is lost by storing the hardware address of the lost device for later use in locating the lost device.

3. The computer-implemented method of claim 1, further comprising notifying the helper mobile device that the lost device has been lost by transmitting the hardware address of the lost device to the helper mobile device.

4. The computer-implemented method of claim 1, further comprising requesting hardware addresses from the helper mobile device that identify discoverable devices connected within the local area network for comparison with the hardware address of the lost device.

5. The computer-implemented method of claim 1, further comprising:
   determining that the lost device is potentially within a specific geographical area;
   determining that the helper mobile device is within the specific geographical area;
   notifying the helper mobile device that the lost device has been lost based on having determined that the helper mobile device is within the specific geographical area.

6. The computer-implemented method of claim 1, further comprising discovering a match between the information collected from the helper mobile device and the hardware address of the lost device.

7. The computer-implemented method of claim 1, further comprising determining that the lost device was observed at the location of the helper mobile device based at least in part on receiving the location data from the helper mobile device.

8. A computer-implemented method for locating lost devices, at least a portion of the method being performed by a computing device comprising at least one processor, the method comprising:
   identifying that an observed device is connected within a local area network by receiving, at a helper mobile device via a connection within the local area network, a hardware address that uniquely identifies the observed device;
   providing, to a server, by an instance of a locating application running on the helper mobile device, the hardware address of the observed device to facilitate a determination, by the server, that the hardware address of the observed device matches a reported hardware address of a known lost device and that, therefore, the observed device comprises the known lost device, wherein the server does not transmit the hardware address to the helper mobile device and the helper mobile device transmits a plurality of observed hardware addresses within the local area network to the server and wherein providing the hardware address of the observed device facilitates the determination by the server by enabling the server to search the plurality of observed hardware addresses for the hardware address to determine that the hardware address of the lost device was observed as being connected within the local area network, wherein the server previously received the reported hardware address of the known lost device before the known lost device was lost and in response to an installation of an instance of the locating application on the known lost device, the locating application thereby aiding the server in finding the mobile device in case of loss and enabling the mobile device to aid the server in finding other mobile devices in case of loss;
   identifying, at the helper mobile device, location data that specifies a location of the helper mobile device;
   providing, from the helper mobile device to the server, the location data to facilitate a determination that the known lost device was observed at the location of the helper mobile device.

9. The computer-implemented method of claim 8, wherein identifying that the observed device is connected within the local area network comprises using a network protocol to discover the lost device on the local area network based on the hardware address of the lost device.

10. The computer-implemented method of claim 8, wherein identifying that the observed device is connected within the local area network comprises using a network protocol to obtain hardware addresses identifying discoverable devices connected within the local area network.

11. The computer-implemented method of claim 8, further comprising:
   receiving, at the helper mobile device, the reported hardware address;

determining, at the helper mobile device, that the reported hardware address matches the hardware address of the observed device.

12. The computer-implemented method of claim 11, further comprising determining, at the helper mobile device, that the known lost device was observed at the location of the helper mobile device, based on the hardware address of the observed device, the reported hardware address, and the location data.

13. The computer-implemented method of claim 8, further comprising:
facilitating, from the helper mobile device, the determination that the observed device comprises the known lost device by providing the hardware address of the observed device to a centralized device that has access to the reported hardware address;
providing, from the helper mobile device, the location data to the centralized device, wherein the centralized device determines that the known lost device was observed at the location of the helper mobile device based on the hardware address of the observed device, the reported hardware address, and the location data.

14. A system for locating lost devices, the system comprising:
a report module programmed to:
receive, at a server, a hardware address of a mobile device that uniquely identifies the mobile device in response to an installation of a locating application on the mobile device, the locating application thereby aiding the server in finding the mobile device in case of loss and enabling the mobile device to aid the server in finding other mobile devices in case of loss;
receive, at a server, a report of a lost device, the report specifying a hardware address that uniquely identifies the lost device;
a collection module programmed to:
collect, at the server, information from an instance of the locating application that is installed on a helper mobile device that has been connected to a local area network that indicates to the server that an observed device with the hardware address of the lost device was observed as being connected within the local area network, wherein the server does not transmit the hardware address to the helper mobile device and the helper mobile device gathers and transmits a plurality of observed hardware addresses within the local area network to the server;
search, at the server, the plurality of observed hardware addresses for the hardware address to determine that the hardware address of the lost device was observed as being connected within the local area network;
a receiving module programmed to receive, at the server, location data from the helper mobile device that specifies a location of the helper mobile device;
a providing module programmed to provide, from the server, the location of the helper mobile device as a location of the lost device in response to the report;
at least one processor that executes the report module, the collection module, the receiving module, and the providing module.

15. The system of claim 14, wherein the report module further registers the lost device before the lost device is lost by storing the hardware address of the lost device for later use in locating the lost device.

16. The system of claim 14, wherein the report module further notifies the helper mobile device that the lost device has been lost by transmitting the hardware address of the lost device to the helper mobile device.

17. The system of claim 16, wherein the report module further requests from the helper mobile device hardware addresses identifying discoverable devices connected within the local area network for comparison with the hardware address of the lost device.

18. The system of claim 14, wherein the report module further:
determines that the lost device is potentially within a specific geographical area;
determines that the helper mobile device is within the specific geographical area;
notifies the helper mobile device that the lost device has been lost based on having determined that the helper mobile device is within the specific geographical area.

19. The system of claim 14, wherein the collection module further discovers a match between the information collected from the helper mobile device and the hardware address of the lost device.

20. The system of claim 14, wherein the receiving module further determines that the lost device was observed at the location of the helper mobile device based at least in part on receiving the location data from the helper mobile device.

* * * * *